United States Patent [19]

Hanscom et al.

[11] Patent Number: 4,577,063

[45] Date of Patent: Mar. 18, 1986

[54] RING DELAY OVERRIDE FOR TELEPHONE ANSWERING SYSTEM

[75] Inventors: Bradford E. Hanscom, Downey; Gerald L. Mock, Corona, both of Calif.

[73] Assignee: T.A.D. Avanti, Inc., Compton, Calif.

[21] Appl. No.: 526,696

[22] Filed: Aug. 26, 1983

[51] Int. Cl.$^4$ ............................................. H04M 1/64
[52] U.S. Cl. .................................................. 179/6.16
[58] Field of Search ...................... 179/6.03, 6.13, 6.16

[56] References Cited

U.S. PATENT DOCUMENTS

| 3,757,049 | 9/1973 | Bonsky et al. | 179/6.16 X |
| 3,909,538 | 9/1975 | Jacobson | 179/6.16 |
| 3,914,551 | 10/1975 | Hunt | 179/6.13 |

FOREIGN PATENT DOCUMENTS 2633882  2/1978  Fed. Rep. of Germany ..... 179/6.16

Primary Examiner—Aristotelis M. Psitos
Attorney, Agent, or Firm—Keith D. Beecher

[57] ABSTRACT

A telephone answering system which may be set to respond only after a predetermined number of rings have been received and which is automatically set to respond only after a greater number of rings are received in the event the message tape is full or broken. The system is controlled by a microcomputer, and includes circuitry such that the microcomputer responds to an indication that the message tape is not operational automatically to set the system to respond to a greater number of rings. This causes the casual caller to hang up, which is desired since the message tape is no longer capable of recording his message, but it still enables the owner to remote the system and have it read back the messages on the message tape.

3 Claims, 2 Drawing Figures

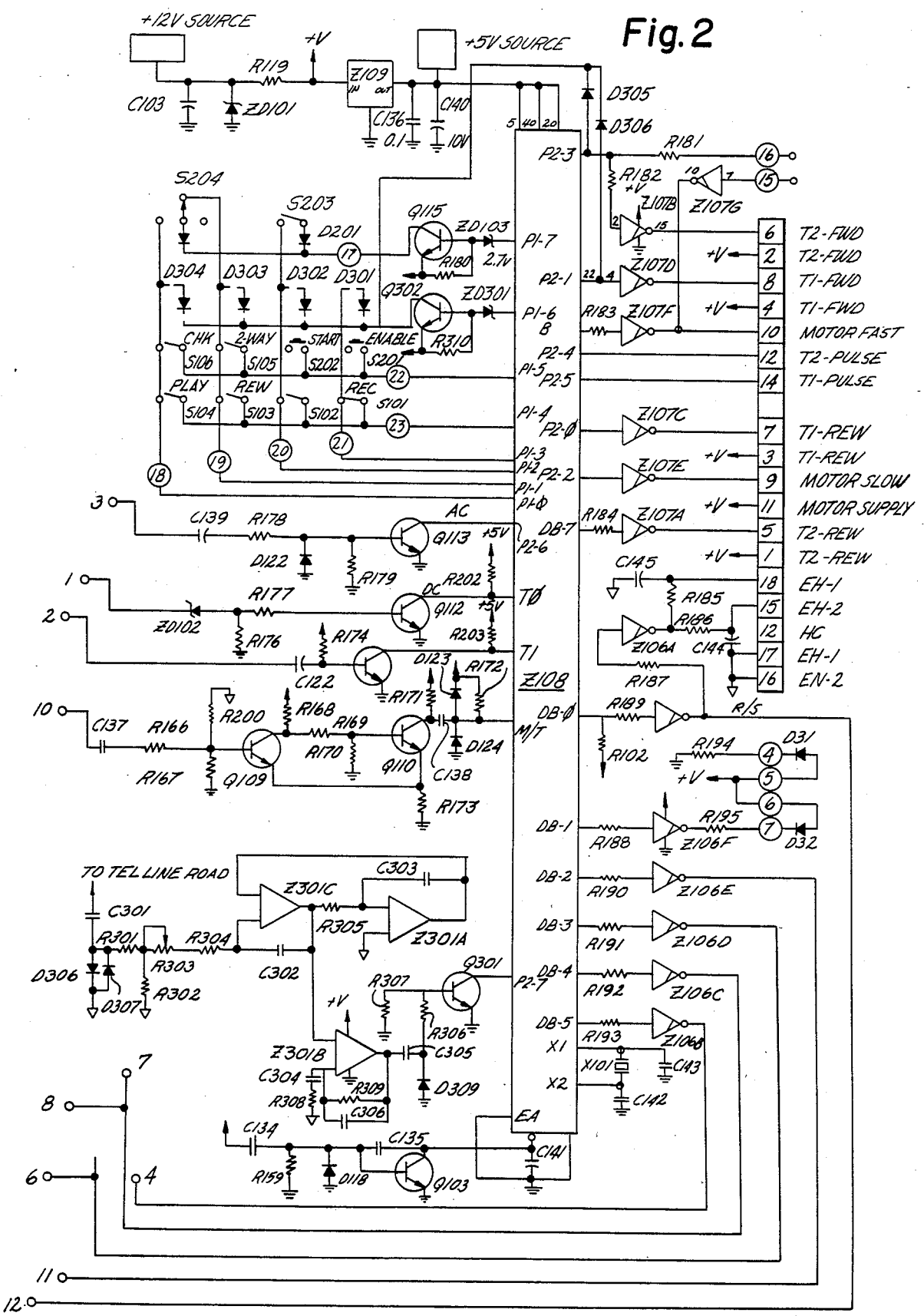

RING DELAY OVERRIDE FOR TELEPHONE ANSWERING SYSTEM

BACKGROUND OF THE INVENTION

The invention is concerned with a telephone answering system which includes a sensing circuit which responds to a ring signal on the telephone line to activate the system. When the system is so activated, a recorded announcement is transmitted over the telephone line to the calling party during a time interval ($T_1$). A message recording tape is then activated in order that the calling party may record his message during a subsequent time interval ($T_2$).

Problems have arisen in the prior art systems when the message tape is full or broken. Unless some provision is made, subsequent callers will send their messages over the telephone line, believing them to be recorded on the machine. A simple solution would be to cause the machine to become inoperative after the message tape is full or broken. However, if the machine is equipped with a remote control feature, this would prevent the owner from calling up from a remote telephone and receiving the messages. Accordingly, in the system of the present invention the machine remains operational even after the message tape is full, but it requires a larger number of rings than normal to operate it. This causes the caller to hang up before the machine becomes operational, yet it permits the owner to remote the machine and obtain his messages. The owner may then erase the messages on the mesage tape, and the machine will automatically return to its operational state.

BRIEF DESCRIPTION OF THE DRAWING

FIGS. 1 and 2 together represent a schematic circuit diagram of a telephone answering system incorporating the concepts of the present invention, in one of its embodiments. In the drawing, all resistor values are in ohms, all capacitor values are in microfarads, unless otherwise designated.

DETAILED DESCRIPTION OF THE ILLUSTRATED EMBODIMENT

Figure 1:
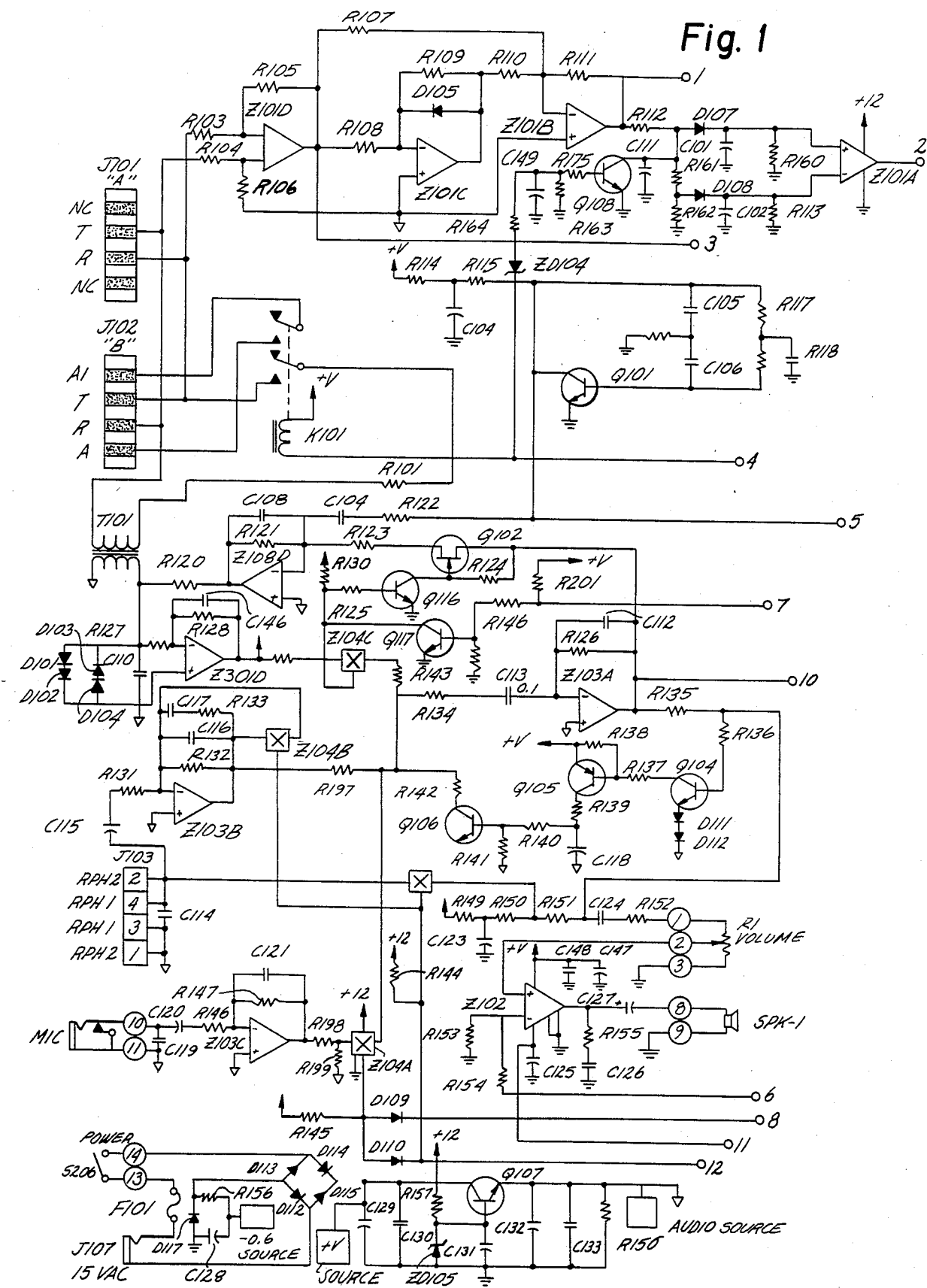

The system shown in the drawing includes a microcomputer Z108 which may be of the type manufactured and sold by National Semiconductor Company, and which is designated by them as INS8048. The system also includes a connector J102 which has terminals 3 and 4 connected to the tip and ring terminals of the telephone line. Line seizure is effectuated by a relay K101. The system is coupled to the telephone line through a transformer T101. The outgoing audio signals corresponding to the announcement transmitted by the system during the announcement interval ($T_1$) is amplified by an amplifier Z103D. The incoming audio signals to be recorded during the message interval ($T_2$) are amplified by an amplifier Z103A. A connected J103 is connected to the record and reproduce duce head RPH2 associated with the T-2 message tape, and to the record and reproduce head RPH1 associated with the T-1 announcement tape.

The incoming audio signals representing the message to be recorded are passed through transformer T101 and through a bilateral analog switch Z104C to amplifier Z103A, and through a bilateral analog switch Z104D to the record/reproduce head RPH2 to be recorded on the message tape T-2. Resistors R149, R150 and R151, together with grounded capacitor C123 provide a bias circuit for the head. An automatic gain control circuit for amplifier Z103A is provided by transistors Q104, Q105 and Q106. The announcement recorded on the announcement tape T-1 is amplified by amplifier Z103B, and through amplifier Z103A and amplifier Z103D to transformer T101 for application to the telephone line.

The ring signal for the telephone answering system is initiated when a ring signal occurs at the tip (T) and ring (R) terminals of connector J102. The ring signal is fed to an operational amplifier Z101D. The alternating current signal output of amplifier Z101D is fed to port P2-6 of microcomputer Z108, by way of a differentiator circuit formed by capacitor C139, resistor R178, diode D122, resistor R179 and transistor Q113.

The microcomputer Z108 decides whether or not the alternating current output of amplifier Z101D is of proper duration ( >400 milliseconds) and amplitude ( >20VRMS), and if so activates the T-1 announcement tape when the ring signal count matches the count set by the ring select switch S203. Ring select switch S203 can be set to cause the system to respond to a selected number of rings before activation, according to the setting of the switch. However, if during a previous $T_2$ message record mode T2 pulses are not received at port P2-4 of the microcomputer, this is an indication that the T-2 message tape has broken or is full. If that occurs, the microcomputer ignores the setting of ring select switch for all future calls and cause the machine to answer only after a large number of rings (e.g. 10) are received.

When the microcomputer Z108 recognizes the preset ring count, or the larger ring count, it initiates a T-1 cycle. The T-1 cycle activates the T-1 announcement tape, causes the system to go off hook, and plays the announcement recorded on the announcement tape over the telephone line. For this purpose, microcomputer Z108 activates port P2-2 which turns on a motor (M1) at its regulated speed (motor slow) by way of driver Z107E, and terminal J105-9. Port P2-1 of the microcomputer is turned on at this time to activate the T-1 forward solenoid. This action in conjunction with the activation of motor M1 pulls in the T-1 head plate and starts the T-1 tape moving. At the same time, port DB-5 of the microcomputer Z108 goes high (1), and its output is fed to an inverting amplifier driver Z106B, whose output $\overline{LS}$ is at ground potential. This activates relay K101 which puts transformer T101 and resistor R101 across the tip and ring terminals of strip J102, providing a line seize (off-hook) condition. Port DB-4 of the microcomputer is low (0) at this time, and its output is inverted by inverter Z106C providing high (1) potential at its output ($T/\overline{R}$). This potential is fed to the base of transistor Q117 to render the transistor conductive. When transistor Q117 is conductive, it causes the bilateral analog switch Z104C to be opened.

Audio signals corresponding to the audio announcement recorded on the moving T-1 tape are picked up by record head RP-1 and fed by way of capacitor C115 and resistor R113 to amplifier Z103B. The audio signals are amplified by a gain of approximately 200, and fed to amplifier Z103A by way of resistors R197 and R134, and capacitor C113. The audio signals are amplified in amplifier Z103A by a gain of approximately 100, and is fed to field effect transistor (FET) Q102 which is biased to its conductive state by resistor R124. So long as transistor Q116 is non-conductive, the announcement audio signals are passed through FET Q102 to amplifier Z103D, from which they are fed to the line transformer T101. The line transformer transmits the outgoing audio announcement signals to the telephone line.

The audio output from Z103A is also fed to a Schmitt trigger formed of transistors Q109 and Q110 by way of capacitor C137 and resistor R166. The squared audio signal from the collector of Q110 is fed to a differentiator circuit formed by capacitor C138 and resistor R172. The resulting negative-going spikes are interrogated by microcomputer Z108 by way of port $\overline{INT}$ to detect a beep tone (1530 Hz–2070 Hz) which is recorded on the T-1 announcement tape, and which signals the end of the T-1 announcement. When the beep tone recorded on the T-1 tape is recognized, the microcomputer turns off port P2-1 which releases the T-1 forward solenoid. This action causes the T-1 head plate to retract, and stops the T-1 tape.

The message recording cycle ($T_2$) begins when the beep tone on the announcement tape (T-1) is recognized by the microcomputer Z108. When the message recording cycle ($T_2$) begins, the message tape T-2 is activated to permit the recording of the message received from the calling party over the telephone line for the length of the time specified by the setting of the message time switch S204. In the "none" position the message recording cycle ($T_2$) shuts off immediately. When the switch S204 is in the "fix" position, the message received over the telephone line may be recorded up to a fixed interval of time, after which the machine will automatically shut off. When the switch S204 is in the "VOX" position, the message received over the telephone line will continue to be recorded on the message tape T-2 for so long as the calling party continues to talk, up to the capabilities of the message tape. Specifically, the machine will continue to record the message until there is a 7 second break in the audio signal, or a dial tone is encountered, or a busy signal is encountered, or a pulse due to the calling party hanging up occurs.

The VOX interrogation of the incoming audio signal is controlled by the microcomputer Z108. The external circuitry necessary for this function is a Schmitt trigger formed by transistors Q109 and Q110 which digitizes the audio information. Once the microcomputer has determined that no audio is present, or that a spurious audio signal is present, the microcomputer will output a beep tone to the tape heads by actuating a beep oscillator circuit associated with transistor Q101. The T-2 message tape will now rewind an amount corresponding to the 7 second time-out, and the T-2 tape will then be disengaged. The system will then transfer to the T-1 announcement tape, and rewind the T-1 announcement tape to its origin position, and await the next call.

When the beep tone recorded on the T-1 announcement tape is recognized by the microcomputer Z108, its sets the port P2-1 low (0) which disengages the T-1 forward solenoid. The motor (M1) remains on by way of port P2-2. Port P2-3 is then made high (1), and its output, after inversion by inverter Z107B energizes the T-2 play solenoid. This action, in conjunction with the activation of motor M1 engages the T-2 head plate causing the T-2 message tape to move in the forward direction. The system now enters its $T_2$ cycle, during which port DB-5 remains high (1) maintaining line seizure.

The audio signals from the telephone line are fed into the system when the microcomputer Z108 causes port DB-4 to go high (1), the output being inverted by inverter Z106C causing its output T/R to go low (0). When T/R goes low, Q117 becomes non-conductive to allow voltage from resistor R130 to turn on analog switch Z104C. When switch Z104C is turned on, it permits the audio signal from the telephone line to be passed to amplifier Z103A by way of transformer T101, R127, R129, Z104C, Z143, R134 and C113. Amplifier Z103 feeds audio signals to the heads RPH2 of the T-2 message tape by way of resistors R135 and R151, analog switch Z104D and connector J103-2. Resistors R149 and R150, and capacitor C123 provide a DC bias to the record head. Analog switch Z104D is turned on at this time by the microcomputer Z108 causing port DB-0 to go low (0), and output $R/\overline{P}$ to go high (1), so that audio may be applied to the T-2 heads RPH2. The amplifier Z103B is disabled at this time, because analog switch Z104B is also turned on.

At the end of the $T_2$ message recording interval, port P2-3 goes low releasing the T-2 head plate. Port P2-0 will then go high (1) activating the announcement T-1 rewind solenoid. This causes the announcement tape T-1 to rewind to its origin position. When that position is reached, no more T1 pulses are received at port P2-5 and the microcomputer terminates the rewind operation and sets the system in condition to receive the next call.

Should the owner wish to retrieve his messages from a remote telephone, he sends a remote control signal over the telephone line which is coded in accordance with a predetermined code.

When the remote control is received by the system of FIG. 1, it is fed to amplifier Z301D by way of resistor R127 and transformer T101. Z301D feeds the remote control signal to a narrow bandpass filter consisting of amplifiers Z301C, Z301A and Z301B. The frequency of the remote control signal is adjusted by potentiometer R303. The output of amplifier Z301B is fed to the microcomputer port P2-7 by way of capacitor C305, resistor R306 and transistor Q301.

Once the remote control signal is sampled and its frequency is determined by the microcomputer Z108, it is compared to a diode matrix code created by the removal or insertion of diodes D301 through D304. If its code matches the diode matrix code, the microcomputer will set P2-3 low (0) which causes the T-2 tape to stop, if it has not already stopped due to being full.

If there are messages on the T-2 tape, the microcomputer will activate port DB-7 high (1) causing the T-2 rewind solenoid to be energized to activate the rewind mechanism and rewind the T-2 tape back, either to its beginning position, or to a position that is stored in the microcomputer memory at the point at which the system was last remoted. When the T-2 tape has been rewound, port P2-3 is set high (1) to activate the T-2 forward solenoid and start the T-2 tape moving in its forward direction. Audio information is now fed from the T-2 record/reproduce head (RPH2) through J103 to preamplifier Z103B, and then to Z103A by way of resistor R197, resistor R134 and capacitor C113. Amplifier Z103A feeds the audio information from the T-2 tape to the phone line by way of transistor Q102, R123, switch Z103D, R120 and T101. The messages recorded on the T-2 tape are then transmitted to the calling party over the telephone line.

After all of the messages recorded on the T-2 tape have been transmitted over the telephone line to the caller, the T-2 tape will stop. This is achieved by feeding pulses into port P2-4 from a T-2 pulse switch whenever the message tape is moving. The microcomputer counts these pulses and stores them in memory. When the pulses fed from J105-13 into port P2-4 match the number that are set in memory, the programming of the microcomputer determines that this signifies the end of all the messages recorded on the T-2 tape and will stop the tape. A long tone is then generated by activating port DB-3 low (0), which turns on the Q101 beep oscillator and causing the resulting beep tone to be fed to the telephone line.

At the termination of the continuous beep tone, port DB-3 is caused to go successively high and low, so that the Z101 beep oscillator wil provide a series of beep tones to be transmitted to the calling party over the telephone line.

If all of the messages on the T-2 tape are to be saved, no remote signal is sent over the telephone line by the calling party, and the microcomputer will cause port P2-3 to go low, deactivating the T-2 forward solenoid and causing the T-2 message tape to stop. The microcomputer will then rewind the T-1 announcement tape by causing port P2-0 to go high (1) which turns on the T-1 rewind solenoid. The T-1 solenoid rewinds until the T-1 pulses stop at port P2-5 signifying the beginning of the T1 announcement tape. When the T1 tape reaches its beginning, the system is again ready to answer any calls received over the telephone line.

If the messages on the T-2 tape are not to be saved, the calling party again transmits the remote signal during the period in which the beep signals are transmitted to him, and this signal is fed to port P2-7 and identified. Upon identification of the remote signal, the microcomputer activates port DB-0 low (0) allowing the output of Z106A to go high (1) which turns on the T-2 erase head (EH2). Port P2-3 also goes low (0) releasing the T-2 forward solenoid, and port DB-7 goes high (1) activating the T-2 rewind solenoid. The T-2 tape now rewinds back either to its beginning position, or to the position of the last remote operation, and during rewind, the messages on the T-2 tape are erased because the T-2 erase head (EH2) is activated.

If the T-2 tape was full when the remote operation was initiated, the T2 pulses introduced to port P2-4 of the microcomputer during the remote operation as the T-2 tape rewinds, releases the 10-ring override control by the microcomputer and permits the machine to answer subsequent calls after the number of rings selected by switch S203 until the message tape again becomes full.

The invention provides, therefore, a telephone answering machine which includes an override control system that effectively prevents a caller from attempting to record a message after the message tape is full, and yet still permits the owner to remote the machine and recover his messages.

It will be appreciated that while a particular embodiment of the invention has been shown and described, modifications may be made. It is intended in the claims to cover all modifications which come within the true spirit and scope of the invention.

What is claimed is:

1. In a telephone answering system which responds to ring signals received over the telephone line, and which includes a magnetic tape mechanism (T-1) having a recorded announcement thereon to be transmitted over the telephone line to a caller during a time interval ($T_1$) in response to a predetermined number of ring signals received over the telephone line, and a magnetic tape mechanism (T-2) for recording messages received over the telephone line during a time interval ($T_2$) following the time interval ($T_1$), the combination of: a microcomputer responsive to a predetermined number of ring signals received on the telephone line to activate the system; a first input circuit coupled to the telephone line and to the microcomputer for introducing the ring signal to the microcomputer; an output circuit connected to the microcomputer to be coupled to the telephone line and to the (T-1) tape mechanism by the microcomputer upon the activation of the system by the microcomputer in response to said predetermined number of ring signals received over the telephone line to cause audio signals to be transmitted over the telephone line to a caller representing the announcement recorded on the (T-1) tape mechanism; a second input circuit connected to the microcomputer to be coupled to the telephone line and to the magnetic tape mechanism (T-2) by the microcomputer at the end of the ($T_1$) time interval for receiving audio signals over the telephone line during the ($T_2$) time interval representing a message from the caller and for causing such audio signals to be recorded on the (T-2) tape mechanism; circuit means connecting said (T-2) tape mechanism to the microcomputer for introducing pulses to the microcomputer in response to movement of the (T-2) tape mechanism; and circuitry connected to the microcomputer and controlled thereby for increasing to a second predetermined number the number of ring signals required to cause the microcomputer to activate the system in the absence of pulses being received by said microcomputer from said circuit means during a preceding ($T_2$) time interval.

2. The combination defined in claim 1, and which includes manually controlled switching circuitry settable to various settings and connected to said microcomputer for determining the predetermined number of ring signals required by said microcomputer to activate the system.

3. The combination defined in claim 2, in which said second predetermined number of ring signals required is independent of the setting of said switching circuitry.

* * * * *